United States Patent

Brewer

[15] 3,676,613

[45] July 11, 1972

[54] REPEATERED SUBMARINE CABLE SYSTEM

[72] Inventor: Sherman Theodore Brewer, Little Silver, N.J.

[73] Assignee: Bell Telephone Laboratories, Incorporated, Murray Hill, Berkeley Heights, N.J.

[22] Filed: Dec. 16, 1970

[21] Appl. No.: 98,670

[52] U.S. Cl. ....................179/170 T

[51] Int. Cl. ....................H04b 3/58

[58] Field of Search..........179/170 R, 170 A, 170 HF, 170 F, 179/170 T, 170 D

[56] References Cited

UNITED STATES PATENTS 3,535,472 10/1970 Babbitt et al. ......................179/170 F 3,254,303 5/1966 Brewer et al. ......................179/170 F

*Primary Examiner*—Kathleen H. Claffy

*Assistant Examiner*—Horst F. Brauner

*Attorney*—R. J. Guenther and E. W. Adams, Jr.

[57] ABSTRACT

As we go to wider bands for submarine cable systems, it becomes difficult to achieve the required power output in undersea repeaters. Two key limitations in determining signal power output capability are the deliverable d.c. power and the temperature rise in the transistors. The present invention is directed to a repeater which employs a class B, rather than the usual class A, output amplifier with energy storage and regulation to overcome both limitations.

6 Claims, 2 Drawing Figures

INVENTOR
S. T. BREWER
BY John P. McDonnell
ATTORNEY

REPEATERED SUBMARINE CABLE SYSTEM

BACKGROUND OF THE INVENTION

This invention relates to submarine cable telephony systems and, more particularly, to high efficiency repeaters for submarine cable systems.

Experience has shown that power is preferably supplied to a plurality of repeaters along a submarine cable by a direct current which is regulated to be substantially constant in order to obtain best performance and longest life of the cable components. Since power can only be supplied from the shore stations, these constant current sources are generally connected at each land or terminal station in series with respect to the cable and each other. The power output of each repeater is, of course, limited by the power which can be supplied to the repeater. Since there is a large distance between the shore station power supplies, the amount of power which can be delivered to a repeater is restricted and optimum use of the power available is a primary objective.

In view of this optimum use of power objective, the manner by which power is transferred from the cable to the repeater must involve only a relatively negligible amount of power loss or, in other words, must have a high efficiency. For example, the obvious power transfer method of using a serial string of resistors in the cable power path with the voltage drop across the resistor associated with each repeater being used to supply the operating potentials to the repeater amplifier would be unacceptable in modern submarine cable systems due to the amount of power lost as heat in each resistor. A modern submarine cable system might thus employ relatively complex d.c. to d.c. conversion and regulating circuitry having a relatively high efficiency for such power transferring purposes to conserve the available power. Such circuitry, however, would increase the cost and complexity of the repeater and reduce the reliability, a critical factor in a repeater at the bottom of the ocean.

In addition to the loss of repeater power due to power transferring networks, signal power output of the repeater is also limited by the power dissipated in the devices in the amplifying unit. Such amplifiers are normally biased for class A operation and as such represent a constant power dissipating load. This power dissipation, combined with the aforenoted power transfer losses, critically limits the repeater performance in wideband systems which require greater amounts of power. Moreover, the amount of power which must be supplied is increased by the requirement that sufficient power be available to enable each repeater to draw a surge of power in the event of an isolated peak signal input or a peak noise signal, i.e., a single peak condition as opposed to a series or plurality of peaks. A wideband cable system having a multichannel load with a relatively high incidence of isolated peak signals due either to signal input or noise, or the simultaneous occurrence of signal and noise, would thus require an extremely high level of available power. Although these problems could possibly be solved by the brute force approach using conventional techniques involving larger devices and higher operating temperatures, the use of larger devices tends to impair the high frequency performance, while higher operating temperatures are in conflict with reliability objectives.

It is, therefore, an object of this invention to provide a submarine cable repeater using simple and reliable components which requires less operating power without sacrificing output signal power.

It is another object of this invention to provide a submarine cable repeater for wideband systems which does not require either larger devices or higher operating temperatures.

SUMMARY OF THE INVENTION

The present invention is directed to a repeater for a wideband submarine cable system which employs an amplifier with energy storage and regulation to obtain the aforenoted objectives. Biasing the repeater amplifier for the class B, rather than the heretofore conventional class A, mode of operation results in the transistors being cut-off over a portion of the incoming signal range, thereby eliminating the constant load presented by class A amplifiers and reducing the power consumed by the amplifier. In addition, the energy storage network, which may be a low pass filter, is connected between the power input terminals of the amplifier and the path along which power is supplied down the cable to supply energy stored during small signal conditions to the amplifier during an isolated peak signal condition. The power system, therefore, need not have the added capability of supplying power surges to each repeater for each isolated signal or noise peak transmitted along the cable. A regulating zener diode is connected across the terminals of the energy storage network and in the power path to limit the power drawn by the amplifier and bypass the portion of the transmitted power not required by the amplifier for other than maximum signal conditions. The zener diode also incidentally protects the repeater from voltage transients in the system. At maximum signal conditions during the transmission of a plurality of peak signals, it is no longer necessary to limit the power drawn by the amplifier and all the power available is drawn through the energy storage network to the amplifier. At this condition, there is no longer sufficient current to sustain reverse conduction through the zener diode which will cease to conduct. The power consumed by the repeater is thus proportional to the average value of the signal rather than the instantaneous value of the signal. Since the combination of the class B amplifier energy storage network and regulating or bypass zener diode is simple and reliable, power efficiency is obtained only at a slight sacrifice of amplifier linearity which, if desired, can be easily and simply compensated for by feedforward techniques such as that illustrated in FIG. 2.

BRIEF DESCRIPTION OF THE DRAWINGS

Other objects and features of the present invention will be readily apparent from the following discussion and drawings, in which.

DETAILED DESCRIPTION

Figure 1:
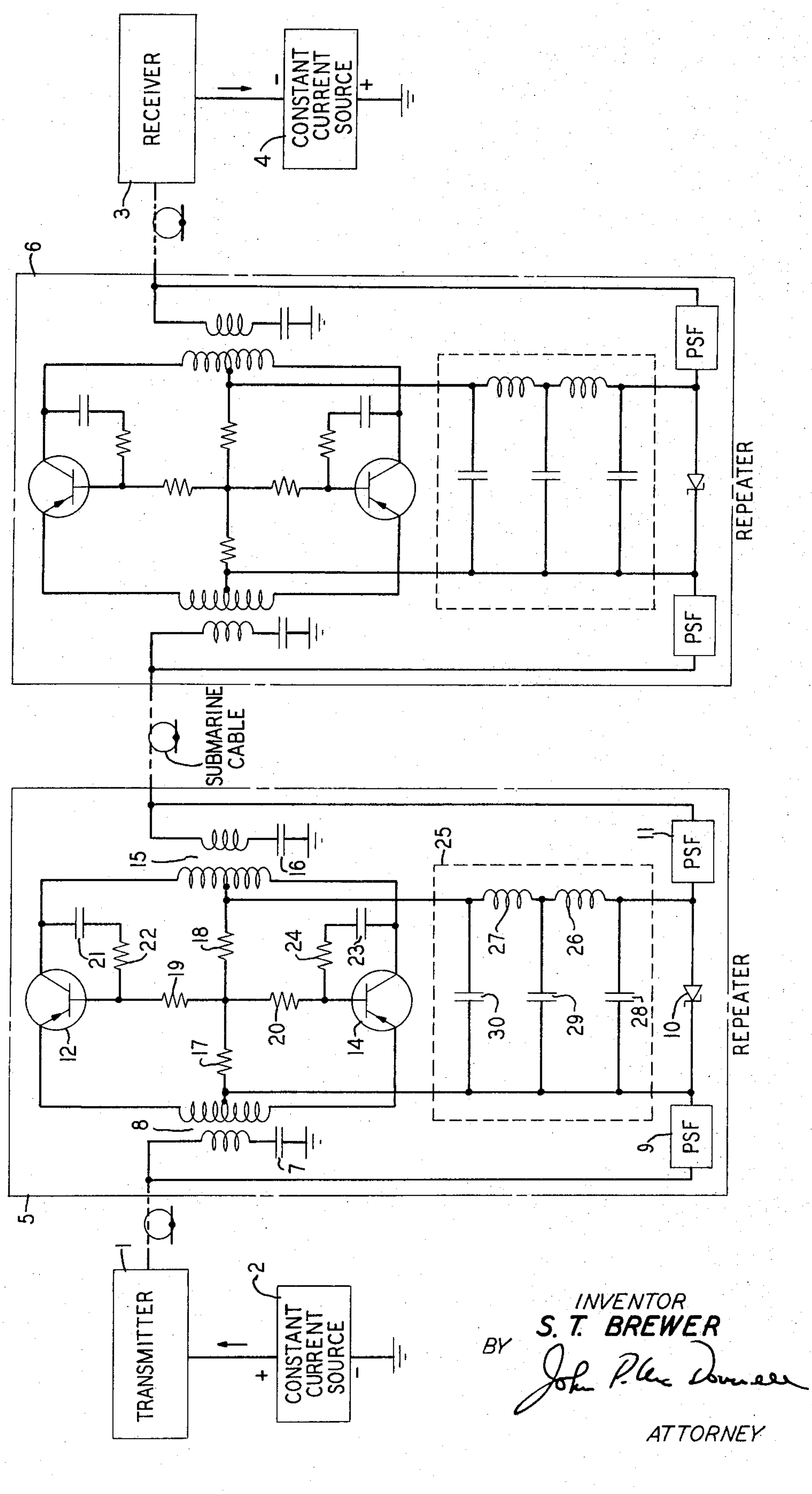
FIG. 1 schematically illustrates a submarine cable having repeaters embodying the present invention.

In the two-terminal submarine cable system illustrated in FIG. 1, a transmitter 1 and a constant current source power supply 2 are connected at one land station terminal, while a constant current source power supply 4 and a receiver 3 are connected at the other land terminal. Another complementary cable transmits signals in the reverse direction. Signals are, therefore, transmitted and received in both directions. The dot-dash boxes 5 and 6 are identical and represent two of the plurality of repeaters connected along the undersea cable at fixed intervals. Since the repeaters are identical, only repeater 5 will be discussed in detail.

As noted heretofore, signal and power are simultaneously transmitted along the same path in submarine cable systems. At the repeater, the signal and power will separate into two paths by power separation filters shown in the drawing in block form labeled PSF. These filters may be any compatible network and as simple as a single inductor. At the input of repeater 5, the signal path is through the primary winding of the transformer 8 and capacitor 7 to ground, while the power path is through the power separation filter 9, zener diode 10, and the power separation filter 11, back to the output of the repeater where the amplified signal and power are recombined for transmission along the cable to the next repeater and ultimately to the terminating land station.

The secondary winding of the transformer 8 in the signal path has its end terminals connected to the emitter electrodes of transistors 12 and 14, respectively. The collector electrodes of transistors 12 and 14 are respectively connected to the end terminals of the primary winding of output transformer 15, which is also in the signal path. The secondary winding of output transformer 15 is connected to the submarine cable and to ground by capacitor 16. Resistor 17 is connected to the mid-point of the secondary winding of transformer 8 and resistor 18 is connected to the mid-point of the primary winding of transformer 15. Resistor 19 connects the base electrode of transistor 12 to resistors 17 and 18 to provide d.c. quiescent bias to transistor 12, while resistor 20 connects the base electrode of transistor 14 to resistors 17 and 18 to provide the d.c. quiescent bias for transistor 14. Capacitor 21 and resistor 22 are serially connected between the collector and base electrodes of transistor 12 to provide negative feedback, and capacitor 23 and resistor 24 are serially connected between the collector and base electrodes of transistor 14 to provide negative feedback for this transistor.

Energy storage filter 25 comprises inductors 26 and 27, and capacitors 28, 29, 30. Capacitor 28 is connected across zener diode 10, and inductor 26 and capacitor 29 are connected across capacitor 28. Inductor 27 and capacitor 30 are connected across capacitor 29. The output of the filter appearing across capacitor 30 is connected between the mid-point of the secondary winding of transformer 8 and the mid-point of the primary winding of transformer 15 to provide the operating power for the repeater, as discussed hereinafter.

Although the aforenoted power problems of the wider band submarine cable system could, as discussed heretofore, possibly be solved by the brute force approach using conventional techniques with higher power levels, this approach involves larger devices and higher operating temperatures. The use of larger devices impairs the high frequency performance, while higher operating temperatures are in conflict with reliability objectives. The higher level of power required in this conventional wideband system would mainly be due to the conventional operation of the repeater amplifiers in the class A mode where they present a constant power dissipating load; the requirement that the level of the power supplied be sufficient to provide the required output power for each repeater whenever an isolated peak signal or noise condition occurs; and the inefficiency in the manner in which power can be simply transferred from the power supplied along the cable to the load. New approaches to the problem must be simple; complex circuitry implies reduced reliability which is unacceptable in underseas submarine cable repeaters.

The present invention is a different approach to the problem that simply and reliably overcomes the aforenoted difficulties, without the need for larger devices or higher operating temperatures, by operating the amplifier in the class B mode and employing energy storage and regulation. The transistors in the class B amplifier are cut-off for at least a portion of the incoming signal range, hence the class B amplifier has a higher power efficiency than the class A amplifier. The energy storage network stores energy during the transmission of lower signal levels through the repeater so that energy will be available to supply the surge of power required by an isolated peak signal input to the amplifier. Since external provisions for these surges of power need no longer be provided, the level of power supplied along the cable may be reduced. The regulating device limits the power drawn by the amplifier and bypasses the portion of the power not required by the amplifier for other than maximum signal conditions. At maximum signal conditions, the regulating device is non-conductive and all the power transmitted along the cable is drawn into the capacitors and inductors of the energy storage network so that power to drive the amplifier to instantaneous peaks of signal is supplied by energy stored in the capacitors and inductors of the energy storage network.

In the repeater of the present invention illustrated in FIG. 1, the amplifier comprising transistors 12 and 14 is biased by resistors 17, 18, 19, and 20 in the class B mode of operation. The input of the energy storage network, which is illustrated as a low pass filter, is connected across the zener diode 10 which is connected in series in the cable power path with comparable zener diodes in all the repeaters along the cable. The output of the low pass filter 25 is connected to the power input terminals of the amplifier. During relatively low signal inputs to the repeater, the filter 25 and the amplifier draw relatively little power from the power path with the zener diode 10 bypassing the excess power. The constant voltage across the zener diode limits the amount of current drawn by the amplifier during this low signal condition and thus acts as a regulating device which both efficiently channels or regulates the power delivered and protects the repeaters from damage due to voltage transients. During this low input signal to the repeater condition, energy is stored in the filter 25. When an isolated input signal peak subsequently appears at the input of the repeater, the surge of power drawn by the amplifier is supplied by the filter 25 rather than from the power delivered along the cable. In other words, the power drawn by the amplifier corresponds to the average value of the signal input rather than the instantaneous value of the signal. This energy storage feature combined with the regulating action of the zener diode 10 thus enables a lower level of power than would be required with conventional techniques to be supplied along the cable due to the more efficient use of power at the repeaters.

A continuous string of input signal peaks, on the other hand, will cause all the energy supplied along the cable to be supplied to the amplifier through the filter 25. Since all the power supplied along the cable is now drawn by the amplifier, the reverse current through zener diode 10 is no longer sufficient to maintain reverse conduction through the diode and the diode ceases to conduct. Once the continuous maximum signal condition ceases to exist, the zener diode 10 again automatically resumes reverse conduction and continues its regulating and protection functions, as discussed heretofore.

The present invention thus automatically supplies the required amounts of power to the amplifiers efficiently, and with a minimum of circuit complexity, without involving larger devices and higher operating temperatures. Several modifications may be made to the repeater illustrated in FIG. 1 without departing from the spirit and scope of the present invention. For example, a rechargeable battery might be connected in place of the capacitor 30 and/or a rechargeable battery might be connected in place of the zener diode 10. If desired, the amplifier comprising transistors 12 and 14 could be biased by resistors 17, 18, 19, and 20 to operate in the class AB, rather than the class B, mode with respect to the input signal, although this would involve some loss in the power efficiency obtained by operation of the amplifier in the class B mode.

The increased efficiency obtained by the present invention for a multichannel single sideband signal input, as opposed to conventional class A operation, may be shown to be 7.4 db (a factor of 5.48) with respect to the limitation of available d.c. power and 8.9 db (a factor of 7.75) with respect to the transistor dissipation limitation. This substantial increase in efficiency is obtained, however, only at the relatively small cost of the decreased linearity incurred with class B amplifiers. If this deficiency should prove troublesome for a particular application, it can readily be overcome with feedforward techniques using conventional hybrid networks or directional couplers such as those described by H. Seidel et al. at pages 651 through 722 in the May-June 1968 issue of *The Bell System Technical Journal*. (It is difficult to develop useful amounts of negative feedback at frequencies in the 100 to 125 mHz range.) One such feedforward network that may be employed is shown in FIG. 2.

Figure 2:
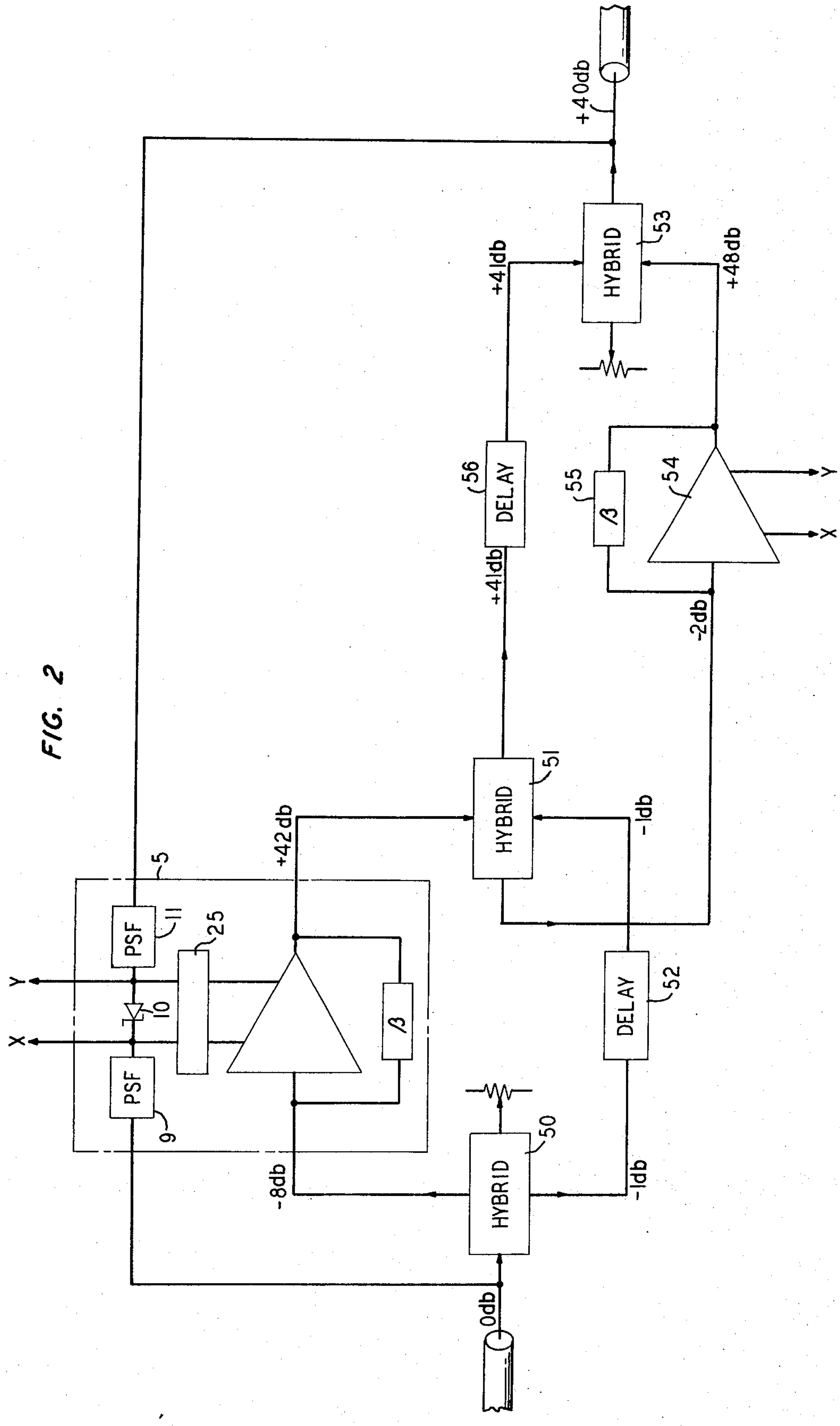
FIG. 2 illustrates an amplifier-repeater using feedforward techniques which might be employed in the submarine cable system of FIG. 1.

In FIG. 2, a repeater such as repeater 5 in FIG. 1, which uses feedforward techniques is shown in block diagram form between its cable input and output. As noted heretofore, the input and output on the physical cable is a combination of signal and power which is separated in the repeater into separate paths. The power for the amplifiers is, as discussed in FIG. 1, separated by a power separation filter and regulated by a zener diode. The dot-dash box of FIG. 1 enclosing repeater 5 is shown in FIG. 2 in block diagram form where power separation filters 9 and 11 have the same designations as in FIG. 1 as do regulating zener diode 10 and energy storage network 25. The amplifier comprising transistors 12 and 14 is shown as the conventional amplifier symbol having a $\beta$ feedback loop obtained with capacitors 21 and 23 and resistors 22 and 24 in FIG. 1. The circuit of the dot-dash block 5 will function in the manner discussed in connection with FIG. 1.

The signal path of FIG. 2 is into the unequal loss hybrid 50 which terminates in a preselected impedance, as illustrated, using techniques well-known in the art. The hybrid 50 divides the incoming signal with one output fed to the circuitry of the dot-dash box 5, the output of this network being supplied as an input to the unequal loss hybrid 51. The other output of the hybrid 50 is fed through a delay network 52 to the second input to hybrid 51. The delay network 52 compensates for the delay associated with the physical length of the path through dot-dash box 5, as well as for the delay distortion associated with rise and roll-off effects of the amplifier in the dot-dash box 5. As will be apparent from the following discussion, the signals at the hybrids 51 and 53 must arrive at the respective inputs at the same time if the distortion is to be eliminated.

The output signal of the dot-dash box 5 has two components, the amplified signal input and a distortion component due to the non-linearity of the class B amplifier. The output of the delay network 52 is a portion of the input signal at substantially the same level that it is at the output of the hybrid 50. As shown in the drawing, for example, if the signal level at the input of the repeater of FIG. 2 were 0 db then the two outputs of the hybrid might typically be at levels of −8 db and −1 db. The signal and distortion level at the output of the dot-dash box 5 would be +42 db due to the amplification obtained, while the level at the output of the delay network would be the same as at the input or −1 db.

The unequal loss hybrid 51 has two outputs, one of which is connected to the input of amplifier 54 which has a $\beta$ feedback network 55 connected around it. The output of amplifier 54 is fed to one input of the unequal loss hybrid 53. The other output of the hybrid 51 is connected to the delay network 56, the output of which is connected to the other input of unequal loss hybrid 53. Both delay networks 52 and 56 may be any compatible delay network, a large number of which are well-known in the art. Hybrid 53 terminates in a preselected impedance, as noted in FIG. 2, and has its output connected to the cable. As also shown in FIG. 2, the operating bias for the amplifier 54 may be derived from the voltage across the zener diode 10 in the dot-dash box 5. If desired, this bias for amplifier 54 may also be obtained from a separate zener diode connected either across zener diode 10 or with a second pair of power separation filters, one of which is connected to the cable input and the other connected to the cable output. The amplifier 54 and feedback network 55 may comprise either the circuitry shown in the dot-dash box 5 or a separate class A amplifier with a feedback network. (No appreciable amount of power is consumed by amplifier 54, hence a class A amplifier may be used.) If signals requiring higher power levels were involved then the circuitry of the dot-dash box 5 of FIG. 1 would be employed in place of the amplifier 54 and $\beta$ feedback network 55 for the reasons discussed heretofore.

By comparing the undistorted output of the delay network 52 with the distorted output of the amplifier of the dot-dash box 5, the hybrid 51 produces one output which represents the desired signal plus some distortion and a second output which represents the distortion. These outputs are, however, inherently at different levels. Following through with the illustrative levels employed heretofore, the desired signal output of the hybrid 51 to the delay network 56 might be at +41 db, while the distortion output fed to the amplifier 54 might be at −2 db. Amplifier 54 would typically have 50 db gain with the distortion signal output level being at +48 db. The signal levels to the hybrid 53 are thus at sufficient levels for the undesired distortion to be reduced appreciably by the action of the hybrid network 53. (The level of the distortion signal input to the hybrid 53 is higher than that of the desired signal plus distortion level since the cancellation of the distortion by the action of the hybrid 53 typically results in a greater distortion signal loss in the hybrid network.) As indicated in FIG. 2, the level of the signal at the output of the repeater is thus an amplified version of the input signal to the repeater, with only a small amount of distortion, at a level 40 db higher than the input signal.

It should be obvious that other techniques known to the art could be employed to eliminate the distortion introduced by operating the amplifier in the class B mode without departing from the spirit and scope of the invention. The feedforward techniques of FIG. 2 could also be modified within the teachings of the present invention by employing a directional coupler in place of the hybrid networks, as discussed heretofore.

Since changes may therefore be made in the above-described arrangement, and different embodiments may be made by those skilled in the art without departing from the spirit and scope of the invention, it is to be understood that the matter contained in the foregoing description and accompanying drawings is illustrative of the principles of the invention and is not to be construed in a limiting sense.

What is claimed is:

1. A repeater for a submarine cable system having a plurality of repeaters connected between shore stations comprising means to separate the power transmitted from said shore stations from the signal being transmitted, an amplifier comprising first and second transistors having their input terminals connected to amplify the signal being transmitted and their output terminals coupled to the output of the repeater, said first and second transistors being biased so as to be non-conductive over a portion of the incoming signal range, energy storage means connected to the power input terminals of said amplifier, regulating means connected to said energy storage means and with said power separation means to bypass a portion of the power being transmitted from said shore stations during the transmission of signals having magnitudes substantially less than peak signal magnitudes and permit all of the power being transmitted from said shore stations to be applied to said energy storage means during the transmission of at least a plurality of peak signals, the power required for an intermittent peak signal being supplied by said energy storage means with energy stored from the power transmitted during the transmission of said signals having magnitudes substantially less than said peak signal magnitudes.

2. A repeater for a submarine cable system in accordance with claim 1 wherein said first and second transistors are biased so as to operate in the class B mode of operation over the incoming signal range.

3. A repeater for a submarine cable system in accordance with claim 1 wherein said energy storage means is a low pass filter such that the power supplied to said amplifier corresponds to the average value of signal being transmitted rather than the instantaneous value of the signal being transmitted.

4. A repeater for a submarine cable system in accordance with claim 1 wherein said regulating means is a zener diode connected so as to be normally conductive in the reverse direction and non-conductive during the transmission of a plurality of peak signals.

5. A repeater for a submarine cable system having a plurality of repeaters connected between shore stations comprising means to separate the power being transmitted from said shore stations from the signal being transmitted, a first amplifier comprising first and second transistors biased so as to be non-conductive over a portion of the incoming signal range to said first amplifier, energy storage means connected to the power input terminals of said first amplifier, regulating means connected to said energy storage means and with said power separation means to bypass a portion of the power being transmitted from said shore stations during the transmission of signals having magnitudes substantially less than peak signal magnitudes and permit all the power transmitted from said shore stations to be applied to said energy storage means during the transmission of at least a plurality of peak signals, the power required for an intermittent peak signal being supplied by said energy storage means with energy stored from the power transmitted during the transmission of said signals having magnitudes substantially less than said peak signal magnitudes, signal dividing means having an input connected to receive said transmitted signal and a first output connected to the input terminals of said first and second transistors, the output terminals of said first and second transistors being connected to a first input of comparing means, means connecting the second output of said signal dividing means to a second input of said comparing means, said comparing means having a first output which represents the distortion introduced by said first amplifier connected to the input of a second amplifier, means connecting said second amplifier to said power separation means and the power transmitted from said shore stations, combining means, means connecting the second output of said comparing means and the output of said second amplifier to said combining means, said combining means causing the distortion components present at its input terminals to be compared and substantially cancelled, and means connecting the output of said combining means with said power separation means and the power being transmitted to said submarine cable, whereby the distortion introduced by said first amplifier in amplifying the signal being transmitted is substantially reduced using feedforward techniques.

6. A repeater for a submarine cable system in accordance with claim 5 wherein said signal dividing means, said comparing means, and said combining means are individual unequal loss hybrid networks.

* * * * *